(12) United States Patent
Kajanto et al.

(10) Patent No.: US 10,570,564 B2
(45) Date of Patent: Feb. 25, 2020

(54) METHOD FOR PREPARING NANOFIBRILLAR CELLULOSE

(71) Applicant: UPM-KYMMENE CORPORATION, Helsinki (FI)

(72) Inventors: Isko Kajanto, Espoo (FI); Markus Nuopponen, Helsinki (FI); Juha Tamper, Levanen (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 242 days.

(21) Appl. No.: 15/328,931

(22) PCT Filed: Aug. 13, 2015

(86) PCT No.: PCT/FI2015/050525
§ 371 (c)(1),
(2) Date: Jan. 25, 2017

(87) PCT Pub. No.: WO2016/024046
PCT Pub. Date: Feb. 18, 2016

(65) Prior Publication Data
US 2017/0218567 A1    Aug. 3, 2017

(30) Foreign Application Priority Data

Aug. 13, 2014 (FI) .................................... 20145718

(51) Int. Cl.
*D21C 9/00* (2006.01)
*D21H 11/18* (2006.01)
(Continued)

(52) U.S. Cl.
CPC .............. *D21C 9/007* (2013.01); *C08H 8/00* (2013.01); *D21B 1/12* (2013.01); *D21C 3/04* (2013.01);
(Continued)

(58) Field of Classification Search
CPC ............. D21H 1/18; D21H 1/22; D21C 9/007
See application file for complete search history.

(56) References Cited

U.S. PATENT DOCUMENTS

2005/0028952 A1* 2/2005 Severeid .................. D21C 9/10
162/57
2008/0057307 A1* 3/2008 Koslow .................. D01D 5/423
428/364
(Continued)

FOREIGN PATENT DOCUMENTS

CA      2880567 A1     2/2014
WO     WO-9954045 A1 * 10/1999 ........... B02C 13/205
(Continued)

OTHER PUBLICATIONS

Smook, Handbook for Pulp and Paper Technologists, 1992, Angus Wilde Publications, 2nd edition, chapters 9 and 13.*
(Continued)

*Primary Examiner* — Anthony Calandra
(74) *Attorney, Agent, or Firm* — Cantor Colburn LLP

(57) ABSTRACT

The method for preparing nanofibrillar cellulose comprises disintegrating (DIS1) fibrous cellulosic raw material to a first disintegration level to a half-fabricate,
transporting (TRANS) the half-fabricate in the first disintegration level in concentrated form to a destination, and
at the destination, disintegrating (DIS2) the half-fabricate from the first disintegration level to the second disintegration level to nanofibrillar cellulose.

17 Claims, 6 Drawing Sheets

(51) Int. Cl.
*D21H 11/22* (2006.01)
*D21B 1/12* (2006.01)
*D21H 11/20* (2006.01)
*C08H 8/00* (2010.01)
*D21C 3/04* (2006.01)

(52) U.S. Cl.
CPC .............. *D21H 11/18* (2013.01); *D21H 11/20* (2013.01); *D21H 11/22* (2013.01)

(56) References Cited

U.S. PATENT DOCUMENTS

| | | | | |
|---|---|---|---|---|
| 2012/0186762 | A1* | 7/2012 | Fassbender | D21C 9/10 162/76 |
| 2016/0176989 | A1 | 6/2016 | Laukkanen et al. | |

FOREIGN PATENT DOCUMENTS

| | | |
|---|---|---|
| WO | 2010092239 A1 | 8/2010 |
| WO | 2012107642 A1 | 8/2012 |
| WO | 2013072559 A1 | 5/2013 |
| WO | 2013121086 A1 | 8/2013 |
| WO | 2013121104 A2 | 8/2013 |
| WO | 2013183007 A1 | 12/2013 |
| WO | 2014029909 A1 | 2/2014 |
| WO | 2014068196 A2 | 5/2014 |
| WO | 2014087052 A1 | 6/2014 |

OTHER PUBLICATIONS

Kang et al., Characterization of Pulp Fines, 2006, TAPPI Journal, 5(2), p. 25-28 (Year: 2006).*

International Search Report dated Nov. 13, 2015; International Application No. PCT/FI2015/050525; International Filing Date Aug. 15, 2015 (5 pages).

Written Opinion dated Nov. 13, 2015; International Application No. PCT/FI2015/050525; International Filing Date Aug. 15, 2015 (6 pages).

* cited by examiner

METHOD FOR PREPARING NANOFIBRILLAR CELLULOSE

CROSS-REFERENCE TO RELATED APPLICATIONS

This application is a National Stage application of PCT/FI2015/050525, filed Aug. 13, 2015, which claims priority to Finnish Application No. 20145718, filed Aug. 13, 2014, both of which are incorporated by reference herein in their entirety.

FIELD OF THE INVENTION

The invention relates to a method for preparing nanofibrillar cellulose. The invention also relates to a product for preparing nanofibrillar cellulose.

BACKGROUND OF THE INVENTION

Nanofibrillar cellulose refers to isolated cellulose microfibrils or microfibril bundles obtained from cellulosic raw material. Nanofibrillar cellulose (NFC), which is also known by other related names, such as nanocellulose and microfibrillar cellulose, is based on a natural polymer, cellulose that is a renewable resource and abundant in nature. Nanofibrillar cellulose has many potential uses for example based on its capability of forming viscous gel in water (hydrogel).

Nanofibrillar cellulose production techniques are based on grinding (or homogenization) of aqueous dispersion of pulp fibers. Because of the production technique at low pulp consistency, the concentration of nanofibrillar cellulose in prepared dispersions is typically low, usually around 1-5%. The prepared fibril cellulose material is a dilute viscoelastic hydrogel. The material itself is usable as such in many applications, but transport costs at such a low concentration from the production site to the user become high. Therefore, the nanofibrillar cellulose is preferably concentrated before the transport, and the user at the destination can dilute the product to a suitable use concentration.

The cellulose in the pulp fibers can also be converted to many chemical derivatives. The derivatization takes place mostly by chemical reactions of the hydroxyl groups in the β-D-glucopyranose units of the cellulose polymer. By chemical derivatization the properties of the cellulose can be altered in comparison to the original chemical form while retaining the polymeric structure.

If cellulose in fibers is derivatized in a suitable way, the fibers are easier to disintegrate to the level of fibrils, nanofibrillar cellulose, because of weakened bonds between the fibrils. For this purpose the cellulose can be anionized or cationized. For example catalytic oxidation of cellulose by heterocyclic nitroxyl compounds (such as "TEMPO", i.e. 2,2,6,6-tetramethylpiperidinyl-1-oxy free radical) produces anionic cellulose where part of C-6 hydroxyl groups are oxidized to aldehydes and carboxylic acids. Another method to produce anionic cellulose is carboxymethylation of cellulose molecules. Cationic cellulose can be produced by adding quaternary ammonium groups to cellulose molecules. The chemical modification allows to consume less energy per mass of cellulose to reach a given disintegration level, and even a disperger-type disintegrator having a series of counterrotating rotors can be used, as disclosed by international application WO 2013072559.

When using cellulose modification to make starting material, pulp which contains cellulosic fibers in suspension, is subjected to chemical modification to reach a suitable degree of substitution, whereafter the fibers are disintegrated to fibrils with nanofibrillar cellulose as product.

Because large amounts of water are involved in the manufacture of nanofibrillar cellulose, most important factor in cutting down the transport costs is to reduce the water content of the product before shipping. Thus, nanofibrillar cellulose is supplied in the form of a concentrate to the destination. However, it has proved difficult to remove water from the hydrogel of nanofibrillar cellulose. Depending on the cellulose type and the end dry matter of the transportable product, there may be also difficulties to redisperse the product at the destination. Too harsh a drying treatment may for example affect the redispersability of the nanofibrillar cellulose so that the original viscosity values of the "fresh" nanofibrillar cellulose are not attained.

SUMMARY OF THE INVENTION

It is the purpose to provide a method for preparing nanofibrillar cellulose which allows the transport of the product to the destination at low cost and allows the user at the destination to adjust the properties of the nanofibrillar cellulose.

The fibrous cellulosic raw material is disintegrated to a first disintegration level, to a half-fabricate, which is transported in the first disintegration level in concentrated form to the destination, where it is disintegrated from the first disintegration level to the second disintegration level, to nanofibrillar cellulose. The nanofibrillar cellulose (NFC) is the end product is which can be used in the end application.

The half-fabricate in the first disintegration level is in an intermediate state between the fibrous cellulosic raw material and final nanofibrillar cellulose. In this state the cellulose fibers are partly fibrillated. It can also be called "partly gelled", because the hydrogel formation is not complete but it already contains nanoscale fibrils dertached from the fibers. This kind of material is easier to dewater to raise the dry matter for the transport, or alternatively the disintegration of the fibrous cellulosic raw material to the first disintegration level can take place already at a higher consistency so that there is no need to dewater the material further before the transport.

The dry matter of the half-fabricate in the first disintegration level in the concentrated form, where it is transported, is at least 15 wt-% and below 80 wt-%. The dry matter is preferably in the range of 20-60 wt-%.

The half-fabricate transported to the destination in the first disintegration level and at high concentration is dispersed and disintegrated to the second disintegration level at the destination. The dispersion and disintegration takes place simultaneously in the same process, which is performed by letting the half-fabricate to pass the pertinent processing device, like a disperser or homogenizer. The half-fabricate is preferably diluted from the high concentration to a suitable processing concentration before the disintegration to the second disintegration level.

When the half-fabricate is already partly fibrillated, no extensive processing is required at the destination. The disintegration can be performed simultaneously with dispersing, the end product being nanofibrillar cellulose thoroughly dispersed in the aqueous medium and disintegrated to the second disintegration level. The half-fabricate is preferably passed only once through the processing device, or two passes at the most.

The destination is preferably the location of use where the end application of the nanofibrillar cellulose takes place. The end application is not limited to any particular use of the nanofibrillar cellulose.

The disintegration level corresponds to the degree of fibrillation of the fibrous material, which is also proportional to the gel formation. The fibrillation means in this context the detachment of fibrils from the cellulose fibers so that fibrils or fibril bundles are formed from the fiber structure. The disintegration level of the obtained product can be expressed numerically by viscometric measuremement results, the disintegration level being proportional to the viscosity of the product measured in standard conditions. The Brookfield viscosity (10 rpm) of the final product, nanofibrillar cellulose (second disintegration level) is higher than the viscosity of the half-fabricate (first disintegration level) when measured at the same concentration.

To make the disintegration processes easier, the fibrous cellulosic raw material is first processed to modified cellulose before the disintegration to the first disintegration level. The purpose of the preliminary modification of the raw material is to increase the susceptibility of fibers to disintegration.

Modification of cellulose to increase the susceptibility of fibers to disintegration can be chemical modification to make derivatized cellulose, such as anionization or cationization. Especially when the modification is anionization and carboxyl groups are introduced in the cellulose molecules in the anionization, the dewatering of the aqueous dispersion of the partly gelled half-fabricate after the disintegration is facilitated by lowering the pH of the dispersion, because anionically charged carboxyl groups of the cellulose are converted to acid form, which reduces the water retention capacity of the dispersion.

At the destination, the half-fabricate is diluted to the concentration suitable for processing it to the second disintegration level, the nanofibrillar cellulose. If the pH of the half-fabricate has been lowered for dewatering purposes, the pH is raised to suitable range by adding a base, for example hydroxide, before the disintegration. If needed, after the disintegration the produced nanofibrillar cellulose can be further diluted from the processing concentration to the concentration suitable for the end use.

DESCRIPTION OF THE DRAWINGS

The method will be described in the following with reference to the accompanying drawings, where.

DETAILED DESCRIPTION OF EMBODIMENTS

General Description of the Method

Figure 1:
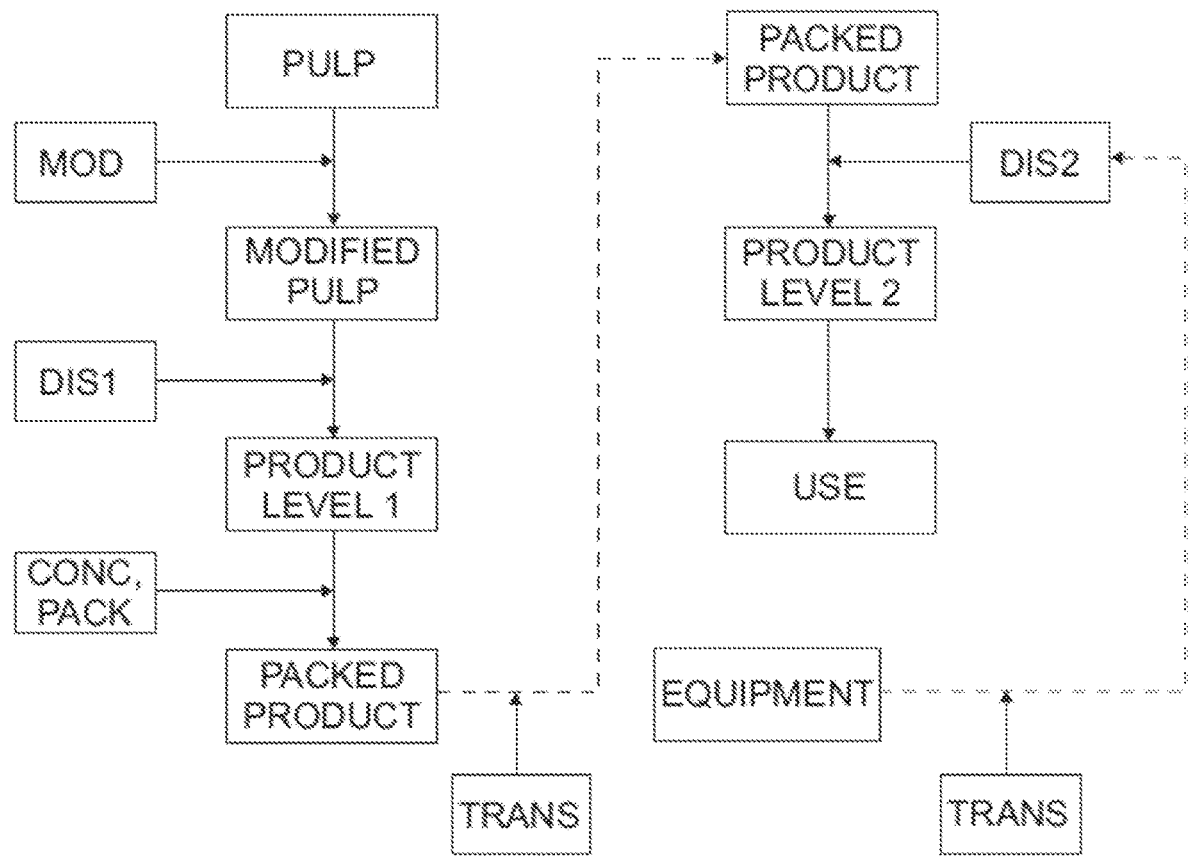
FIG. 1 is a general flowchart of a process for preparing nanofibrillar cellulose.

FIG. 1 shows the order of processing the cellulose from the fibrous raw material (PULP) all the way till the use of the nanofibrillar cellulose (USE). The fibrous cellulosic raw material may first be subjected to preliminary modification (MOD) to facilitate the subsequent disintegration (DIS1) of the cellulose fibres to the first disintegration level, to the half-fabricate (PRODUCT LEVEL 1). Thereafter, the half-fabricate is concentrated to raise its dry matter content and packed to a suitable container for transport (CONC, PACK). The packed half-fabricate is transported (TRANS) to the destination, where the half-fabricate (PACKED PRODUCT) is discharged from the container and diluted to a suitable processing concentration and disintegrated (DIS2) to the second disintegration level, to nanofibrillar cellulose (PRODUCT LEVEL 2). The nanofibrillar cellulose so produced can finally be used in a suitable application (USE).

Fibrous Cellulosic Raw Material

The fibrous cellulosic raw material is obtained normally from cellulose raw material of plant origin. The raw material can be based on any plant material that contains cellulosic fibers, which in turn comprise microfibrils of cellulose. The fibers may also contain some hemicelluloses, the amount of which is dependent on the plant source. The plant material may be wood. Wood can be from softwood tree such as spruce, pine, fir, larch, douglas-fir or hemlock, or from hardwood tree such as birch, aspen, poplar, alder, *eucalyptus* or acacia, or from a mixture of softwoods and hardwoods. Non-wood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed.

One preferred alternative is fibers form non-parenchymal plant material where the fibrils of the fibers are in secondary cell walls. The fibrils originating in secondary cell walls are essentially crystalline with degree of crystallinity of at least 55%. The source can be wood or non-wood plant material. For example wood fibres are one abundant fibrous cellulosic raw material source. The raw material can be for example chemical pulp. The pulp can be for example softwood pulp or hardwood pulp or a mixture of these.

The common characteristics of all wood-derived or non-wood derived fibrous raw materials is that nanofibrillar cellulose is obtainable from them by disintegrating the fibers to the level of microfibrils or microfibril bundles.

Preliminary Modification of the Fibrous Cellulosic Raw Material

The fibrous cellulosic raw material disintegrated to the first disintegration level may be modified fibrous raw material. Modified fibrous raw material means raw material where the fibers is affected by the treatment so that cellulose microfibrils are more easily detachable from the fibers.

The modification is usually performed to fibrous cellulosic raw material which exists as a suspension in a liquid, that is, pulp.

The modification treatment to the fibers can be chemical or physical. In chemical modification the chemical structure of cellulose molecule is changed by chemical reaction ("derivatization" of cellulose), preferably so that the length of the cellulose molecule is not affected but functional groups are added to β-D-glucopyranose units of the polymer. The chemical modifycation of cellulose takes place at a certain conversion degree, which is dependent on the dosage of reactants and the reaction conditions, and as a rule it is not complete so that the cellulose will stay in solid form as fibrils and does not dissolve in water. In physical modification anionic, cationic, or nonionic substances or any combination of these are physically adsorbed on cellulose surface. The modification treatment can also be enzymatic.

The cellulose in the fibers can be especially ionically charged after the modification, because the ionic charge of the cellulose weakens the internal bonds of the fibers and will later facilitate the disintegration to nanofibrillar cellulose. The ionic charge can be achieved by chemical or physical modifycation of the cellulose. The fibers can have higher anionic or cationic charge after the modification compared with the starting raw material. Most commonly used chemical modification methods for making an anionic charge are oxidation, where hydroxyl groups are oxidized to aldehydes and carboxyl groups, and carboxymethylation. A cationic charge in turn can be created chemically by cationization by attaching a cationic group to the cellulose, such as quaternary ammonium group.

One preferred modification method is the oxidation of cellulose. In the oxidation of cellulose, the primary hydroxyl groups of cellulose are oxidized catalytically by a heterocyclic nitroxyl compound, for example 2,2,6,6-tetramethyl-piperidinyl-1-oxy free radical, "TEMPO". These hydroxyl groups are oxidized to aldehydes and carboxyl groups. Thus, part of the hydroxyl groups that are subjected to oxidation can exist as aldehyde groups in the oxidized cellulose, or the oxidation to carboxyl groups can be complete.

The presence of the carboxyl groups in the cellulose makes it possible to use acid-assisted dewatering for the half-fabricate in the first disintegration level to raise its concentration.

As a result of the modification, fibers in the pulp will contain cellulose that is more susceptible to fibrillation (disintegration to fibrils) than before the modification.

The pulp where the cellulose is chemically modified can be characterized by degree of substitution or content of chemical groups. For pulp modified by catalytic oxidation, the following values can be given:

anionicity between 0.5-1.5 meq/g, preferably 0.7-1.3 meq/g (corresponding to carboxylate content of 500-1500 mmol/g, preferably 700-1300 mmol/g).

If the half-fabricate is made by disintegrating at high solids content (high consistency), the anionicity is preferably at least 1.0 meq/g, preferably 1.0-1.3 meq/g (1.0-1.3 mmol COOH/g).

All values are based on the amount of oven dry pulp. The carboxylate content of the pulp is measured by conductometric titration.

In the case of carboxymethylated cellulose, the degree of substitution can be in the range of 0.05-0.3, preferably 0.10-0.25. In the case of cationized cellulose, the degree of substitution can be 0.05-0.8, preferably 0.1-0.45.

The half-fabricate and the final NFC made of chemically modified pulp will have the content of chemical groups in the same ranges as above.

Brookfield Viscosity Measurement for Measuring Properties of the Half Fabricate and NFC On-site viscosity measurement was carried out as follows. A vane spindle (number 73) was selected and the Brookfield-viscosity measuring apparatus (Brookfield RVDV-III) was started. A sample was diluted to a concentration of 0.8% by weight in water and mixed for 10 min using a propel mixer 700-800 rpm. No ultrasound mixing was used for chemically or enzymatically modified grades. The diluted sample mass was added to a 250 ml beaker and the temperature was adjusted to 20° C.±1° C., heated if necessary and mixed.

The spindle was inserted in the beaker and measuring was started. The program registered 300 points at 10 rpm. Relative viscosity was measured from each sample mass twice. Mean value and standard deviation were calculated for each sample, from results obtained from parallel measurements during last 5 seconds.

Disintegration of the Fibrous Cellulosic Raw Material to the First Disintegration Level.

The fibrous cellulosic raw material is disintegrated to the first disintegration level in a treatment where the fibres are partly fibrillated and the obtained half-fabricate is partly gelled. Any equipment suitable for the manufacture of the final product, nanofibrillar cellulose, can in principle be used for manufacturing the half-fabricate, such as a refiner, grinder, homogenizer, colloider, friction grinder, ultrasound sonicator, fluidizer such as microfluidizer, macrofluidizer or fluidizer-type homogenizer. The number of passes is less than in manufacturing the final product, or other processing variables such as residence time, pressure etc. can be adjusted.

One preferable method of making the half-fabricate is to feed the fibrous cellulosic raw material through a series of concentric counterrotating rotors of a disintegrating device and to use impacts to the fibrous cellulosic raw material caused by the counterrotating rotors. This is especially useful when the fibrous raw material is ionically charged, especially anionized cellulose such as catalytically oxidized (heterocyclic nitroxyl compounds such as "TEMPO") or carboxymethylated cellulose. However, also a homogenizer or fluidizer can be used for making the half-fabricate if the fibrous raw material is at low consistency.

Figure 2:
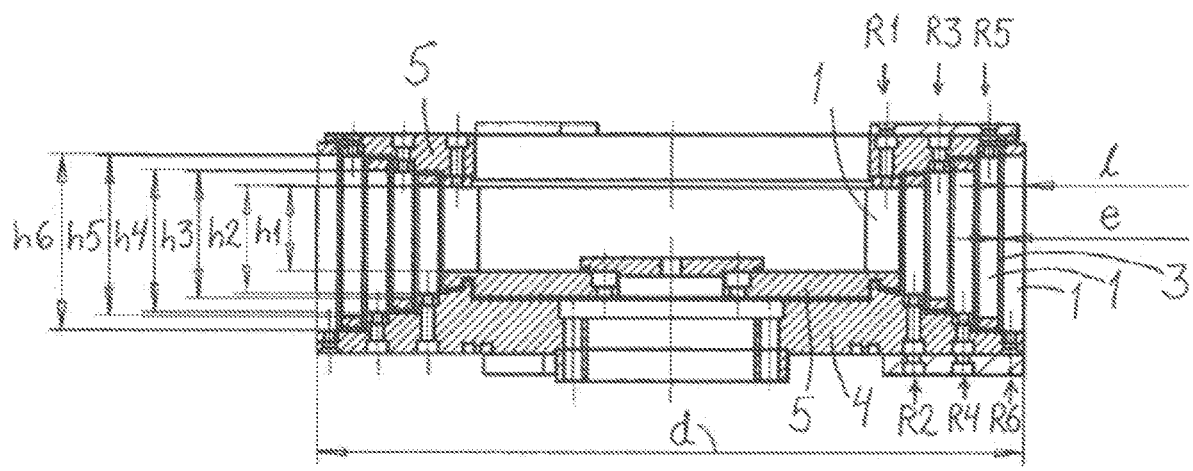
FIG. 2 shows a device used in the invention in a sectional plane A-A

The said device is shown in FIG. 2. The device comprises several counter-rotating rotors R1, R2, R3 . . . placed concentrically within each other so that they rotate around a common rotation axis RA. The device comprises a series of rotors R1, R3 . . . rotating in the same direction, and rotors R2, R4 . . . rotating in the opposite direction, wherein the rotors are arranged pairwise so that one rotor is always followed and/or preceded in the radial direction by a counter-rotating rotor. The rotors R1, R3 . . . rotating in the same direction are connected to the same mechanical rotating means 5. The rotors R2, R4 . . . rotating in the opposite direction are also connected to the same mechanical rotating means 4 but rotating in a direction opposite to the direction of the aforementioned means. Both rotating means 4, 5 are connected to their own drive shaft which is introduced from below. The drive shafts can be located concentrically with respect to the rotation axis RA, for example in such a way that the outer drive shaft is connected to a lower rotating means 4, and the inner drive shaft placed inside it and rotating freely with respect to it, is connected to an upper rotating means 5.

The figure does not show the fixed housing for the device, inside which the rotors are placed to rotate. The housing comprises an inlet, through which material can be supplied from above to the inside of the innermost rotor R1, and an outlet located by the side, oriented approximately tangentially outwards with respect to the peripheries of the rotors. The housing also comprises through-holes for the drive shafts down below.

In practice, the rotors consist of vanes or blades 1 placed at given intervals on the periphery of a circle whose geometric centre is the rotation axis RA, and extending radially. In the same rotor, flow-through passages 2 are formed between the vanes 1, through which passages the material to be refined can flow radially outwards. Between two successive rotors R1, R2; R2, R3; R3, R4; etc., several blade spaces or gaps are formed repeatedly and at a high frequency during the rotary movement of the rotors in the opposite direction. In FIG. 2, reference numeral 3 denotes such blade gaps between the blades 1 of the fourth and fifth rotors R4, R5 in the radial direction. The blades 1 of the same rotor form narrow gaps, i.e. blade gaps 3, with the blades 1 of the preceding rotor (having the narrower radius on the periphery of the circle) in the radial direction and with the blades 1 of the next rotor (placed on the periphery of the circle with the greater radius) in the radial direction. In a corresponding manner, a large number of changes in the impact direction are formed between two successive rotors when the blades of the first rotor rotate in a first direction along the periphery of the circle, and the blades of the next rotor rotate in the opposite direction along the periphery of a concentric circle.

The first series of rotors R1, R3, R5 is mounted on the same mechanical rotating means 5 that consists of a horizontal lower disc and a horizontal upper disc, connected to each other by the blades 1 of the first rotor R1, innermost in the radial direction. On the upper disc, in turn, are mounted the blades 1 of the other rotors R3, R4 of this first series, with the blades 1 extending downwards. In this series, the blades 1 of the same rotor, except for the innermost rotor R1, are further connected at their lower end by a connecting ring. The second series of rotors R2, R4, R6 is mounted on the second mechanical rotating means 4 which is a horizontal disc placed underneath said lower disc, and to which the blades 1 of the rotors of the series are connected, to extend upwards. In this series, the blades 1 of the same rotor are connected at their upper end by a connecting ring. Said connecting rings are concentric with the rotation axis RA. The lower discs are further arranged concentrically by an annular groove and a matching annular protrusion on the facing surfaces of the discs, also placed concentrically with the rotation axis RA and being equally spaced from it.

FIG. 2 shows that the vanes or blades 1 are elongated pieces parallel to the rotation axis R1 and having a height greater than the width I (the dimension in the radial direction). In the horizontal section, the blades are quadrangular, in FIG. 2 rectangular. The fibre material is passed crosswise to the longitudinal direction of the blades, from the centre outwards, and the edges at the sides of the surfaces facing the radial direction in the blades 1 form long and narrow blade gaps 3 extending in the longitudinal direction of the blade, with the corresponding edges of the blades 1 of the second rotor.

The rotors R1, R2, R3 . . . are thus, in a way, through-flow rotors in the shape of concentric bodies of revolution with respect to the rotation axis, wherein their part that processes the fibre material consists of elongated vanes or blades 1 extending in the direction of the rotation axis RA, and of flow-through passages 2 left therebetween.

FIG. 2 also shows that the heights h1, h2, h3 . . . of the rotor blades 1 increase gradually from the first, i.e. the innermost rotor R1 outwards. As a result, the heights of the flow-through passages 2 limited by the rotor blades 1 also increase in the same direction. In practice, this means that when the cross-sectional area of the radial flow increases outwards as the peripheral length of the rotors increases, the increase in the height also increases this cross-sectional area. Consequently, the travel speed of a single fibre is decelerated in outward direction, if the volume flow is considered to be constant.

By the centrifugal force caused by the rotational movement of the rotors, the material to be processed is passed through the rotors with a given retention time.

Figure 3:
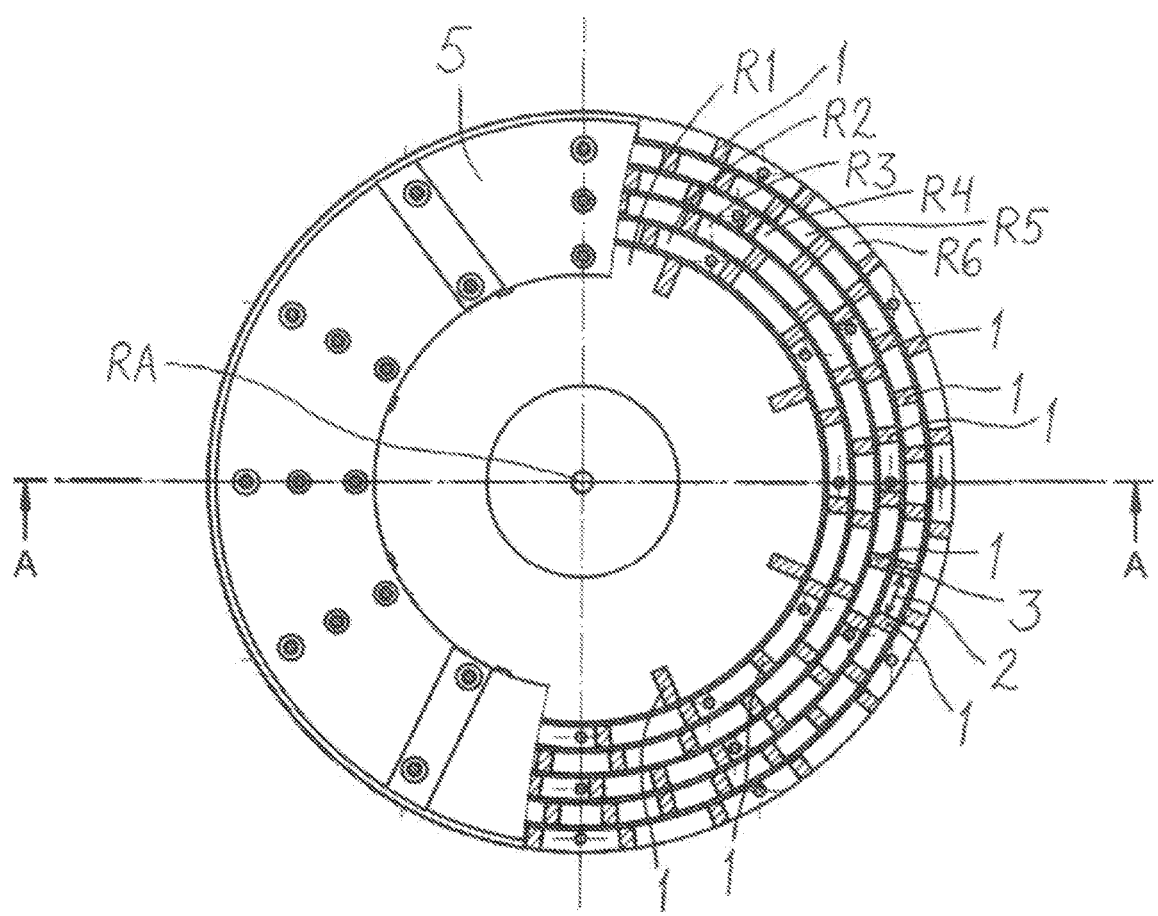
FIG. 3 shows the device of FIG. 2 in a partial horizontal section.

As can be easily concluded from FIG. 3, during a single whole rotation of a pair of rotors (from a position in which given blades 1 are aligned, to the position in which the same blades 1 are aligned again), several blade gaps 3 are formed when successive blades 1 in the peripheral direction encounter successive blades 1 of the second rotor. As a result, the material transferred through the passages 2 outward in the radial direction is continuously subjected to shear and impact forces in the blade gaps 3 between different rotors and in the flow-through passages 2 between the blades 1 on the periphery of the rotor, when the material is passed from the range of the rotor to the range of an outer rotor, while the movement of the blades in peripheral direction and the directional changes of the movement caused by the rotors rotating in different directions prevent the through-flow of the material too fast out through the rotors by the effect of the centrifugal force.

Blade gaps 3 and, correspondingly, encounters of blades 1 and respective changes in the impact directions in two rotors successive in the radial direction are generated at a frequency of [1/s] which is 2×fr×n1×n2, where n1 is the number of blades 1 on the periphery of the first rotor, n2 is the number of blades on the periphery of the second rotor, and fr is the rotational speed in revolutions per second. The coefficient 2 is due to the fact that the rotors rotate at the same rotational speed in opposite directions. More generally, the formula has the form (fr(1)+fr(2))×n1×n2, where fr(1) is the rotational speed of the first rotor and fr(2) is the rotational speed of the second rotor in the opposite direction.

Furthermore, FIG. 3 shows how the number of blades 1 may be different in different rotors. In the figure, the number of blades 1 per rotor increases starting from the innermost rotor, except for the last rotor R6 where it is smaller than in the preceding rotor R5. As the rotational speeds (rpm) are equal irrespective of the location and direction of rotation of the rotor, this means that the frequency at which the blades 3 pass a given point and, correspondingly, the frequency of formation of the blade gaps 3 increases from the inside outwards in the radial direction of the device.

In FIG. 2, the dimension l of the blades in the direction of the radius r is 15 mm, and the dimension e of the blade gap 3 in the same direction is 1.5 mm. Said values may vary, for example from 10 to 20 mm and from 1.0 to 2.0 mm, respectively. The dimensions are influenced by, for example, the consistency of the fibre material to be treated.

The diameter d of the device, calculated from the outer rim of the outermost rotor R6, can vary according to the capacity desired. In FIG. 1, the diameter is 500 mm, but the diameter can also be greater, for example greater than 800 mm. When the diameter is increased, the production capacity increases in a greater proportion than the ratio of the diameters.

Setting the Concentration of the Half-fabricate Prior to Transport

The concentration of the half-fabricate is set high enough for the transport to reduce the transport costs, i.e. the water content of the product is adjusted.

The water content can be adjusted in two ways
- after the first disintegration treatment, raising the concentration of the half-fabricate (concentration of the fibrous matter, i.e. fibers, fiber fragments and microfibrils) by removing water, or
- performing the first disintegration treatment of the fibrous cellulosic raw material in such a high consistency of the fibers that the half-fabricate is already at a high concentration of the fibrous matter, so that it can be transported at such a concentration.

The pulp is usually subjected to disintegration treatment (DIS1) at a consistency of 1-5%, and the half-fabricate exits the treatment in the same concentration. Since the fibrous matter that exists in aqueous suspension in the half-fabricate has a substantially larger average particle size than the final product and is only partly gelled, dewatering of such a suspension is easier. The dewatering of the suspension can be enhanced by using the procedure described in WO 2013/121086, that is, by lowering the pH of the suspension when the cellulose of the fibrous matter is anionically charged and contains carboxyl groups (carboxymethylated cellulose, oxidized cellulose). Lowering the pH of an aqueous medium containing the fibrous matter changes the interactions between the fibrous matter and water so that the water retention capacity of the fibrous matter is reduced, thus enabling water to be removed therefrom mechanically and/or by evaporation. If the cellulose contains anionically charged groups that act as bases (acid moieties in dissociated form), lowering the pH will convert these groups to undissociated form and the electrostatic repulsion between the particles of the fibrous matter is no more effective and the water-particle-interaction is changed. The cellulose containing anionically charged groups can be for example chemically modified cellulose that contains carboxyl groups as a result of the modification. Cellulose obtained through N-oxyl mediated catalytic oxidation (e.g. through 2,2,6,6-tetramethyl-1-piperidine N-oxide) or carboxymethylated cellulose are examples of anionically charged fibril cellulose where the anionic charge is due to a dissociated carboxylic acid moiety. The pH of the suspension is lowered under the value of 4, preferably under 3. Organic or inorganic acid can be used.

Examples of the properties of a half fabricate obtained by disintegration at a consistency of 1-5% are shown in the following Table 1

TABLE 1

Properties of the half fabricate, disintegration of anionized pulp by the disperser-type device of FIGS. 2 and 3 in one pass or in two passes, disintegration consistency of the pulp 2.7%, pH 7.3. Carboxylate amount of the pulp 0.81 mmol/g. Percent values show the measuring concentration.

|  | 1 pass | 2 pass |
|---|---|---|
| Turbidity (HACH), 0.1% (NTU) | 56 | 42 |
| Viscosity Brookfield 10 rpm, 0.8% (mPas) | 210 | 3300 |

The results of the dewatering steps of the half-fabricates by lowering the pH and subsequent pressure filtration are shown in the following Table 2.

TABLE 2

Pressure filtration of the pulps of Table 1. Temperature 62° C., pH 2.5.

|  | 1 pass | 2 pass |
|---|---|---|
| Dry matter content (%) | 41.9 | 27.4 |
| Capacity (kg/m$^2$/h) | 17.7 | 15.2 |

The filtration capacity means mass of dry matter (filter cake) produced per one square meter of filtration area in one hour, and it is considerably higher than with NFC under the same conditions.

Figure 4:
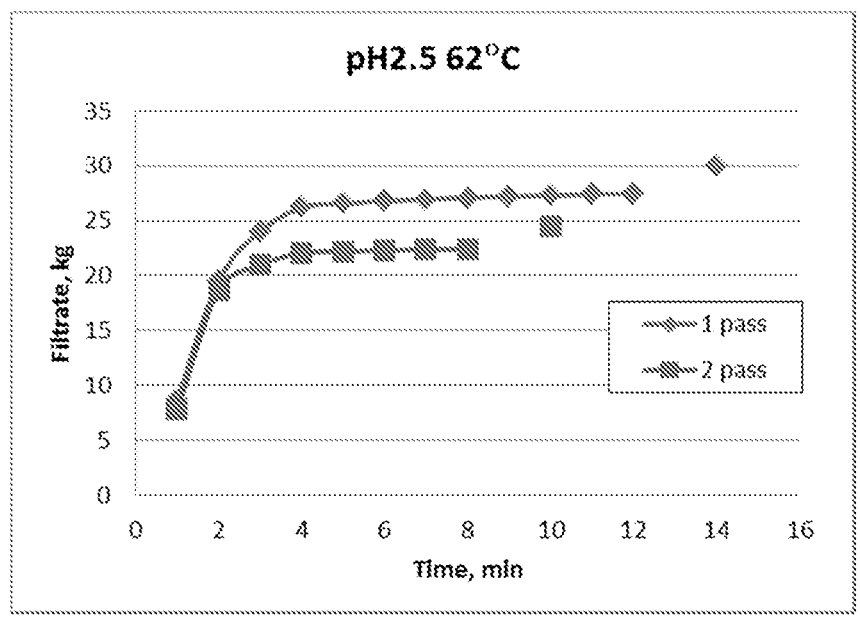
FIGS. 4-11 show some test data of the half-fabricate and the final NFC.

In FIG. 4, the example of the dewatering step is represented graphically with the two pulps. The device was a membrane filter press using the pressure of 0-3 bar at the filling stage and 10 bar at the pressing stage. The flow of the filtrate ceased soon, because the filter cake was ready rapidly. Minimum total time in the filtration cycle is about 10 min, whereas the corresponding time for the NFC is typically 25-30 min under the same conditions. If the filtration cycle is not to be speeded up, pressing is not necessarily needed. Shorter filtration cycles raise the filtration capacity further.

Thus, it is possible to increase the dry matter of the half-fabricate to at least 40 wt-% or higher, especially to 40-50 wt % (concentration of fibrous matter) by lowering the pH of the suspension and then removing water mechanically from the suspension. This can performed in practice by pressure filtration. The concentration can be continued further by evaporation of water, for example by air drying, to nearly dry or dry half-fabricate (for example to dry matter of at least 90 wt-%). However, dry matter above 60 wt % may not be advantageous, because this is the limit where the so-called hornification sets in.

After the dewatering, if the pH has been lowered for the dewatering, the half-fabricate may be neutralized with a base, or it can be left in the acid form. The half-fabricate left in the acid form and transported in the acid form can be neutralized at the destination, for example to set the dispersion to a preferable pH range for the disintegration to final NFC product.

As an alternative to dewatering, the half-fabricate can be prepared so that it issues already from the disintegration treatment (DIS1) at a sufficiently high concentration (high solids disintegration). It is for example possible to use the above-described device of concentric counterrotating rotors to perform the disintegration at a high pulp consistency, above 10%. The disintegration is performed in the conditions where water is sufficiently present to prevent the formation of bonds between the fibres. The pulp consistency is preferably in the range of 15-40% and most preferably 15-30%. Ionically charged cellulose is preferably used as the fibrous cellulosic raw material, especially anionized cellulose such as catalytically oxidized (heterocyclic nitroxyl compounds such as "TEMPO") or carboxymethylated cellulose. The disintergration of the fibrous cellulosic raw material to the desired level can be adjusted by the conversion degree of the cellulose and the number of passes through the device. The half-fabricate can be packed in the concentrated form for transport without active dewatering steps, although some drying can take place before the packing.

The fiber length of the half-fabricate can be studied with FiberLab analyzer, which is able to measure the dimensions of visible fibers (but not cellulose microfibrils or microfibril bundles). In half-fabricate made by disintegrating the fibrous raw material (oxidized cellulose, carboxylate amount 1.1 mmol/g) in the above-described disperser-type device at high consistency in three passes, the length-weighted average fiber length according to Tappi T 271 om-07 was 0.36 mm, whereas with reference sample having the same oxidetion level and disintegrated to final quality (to NFC), the value is 0.27 mm. Thus, it can be estimated that in the half-fabricate, the measurable length-weighted average fiber length is below 0.4 mm. In any case, the value of the half-fabricate is higher than in the final NFC. In numerical distribution, the fiber length fraction of 0.00-0.20 mm had the largest amount of fibers detectable by the method, whereas the fractions 0.2-0.5 mm and 0.5-1.2 mm were smaller.

Transport of the Half-fabricate

After the disintegration of the fibrous cellulosic raw material to the first disintegration level and possible dewatering, the half-fabricate is transported to another location from the manufacturing location. The dry matter of the half-fabricate can be at least 15 wt-% and below 80 wt-%, preferably 20-60 wt-% for transport. The dry matter of the half-fabricate is the amount of fibrous matter, which can be fibers, fiber fragments and microfibrils detached from the fibers.

The dry matter content of 20-60 wt-%, that is, not completely dry, is suitable for transport, because the processing costs increase with the amount of water which is to be removed from the half-fabricate, especially in higher dry matter contents, which may also have harmful effect on the reprocessability of the half-fabricate. On the other hand, below 20 wt % the material becomes sticky, and too much water must be transported along with the product.

In general, the fibrous matter which is not yet fully fibrillated and gelled can be dewatered more easily than the strongly hydrophilic final product, nanofibrillar cellulose.

For the transport of the half-fabricate, any means of transport conventionally used for the pulp can be used. The half-fabricate can be transported in closed rigid containers, especially in shipping containers, or in bags, especially so called big bags, also known as FIBC/flexible intermediate bulk container) Because of the water content, the containers or bags are water-vapour proof to prevent the drying of the half-fabricate. The transport can take place by road vehicles, trains or ships, or even as air freight.

Disintegration of the Half-fabricate to the Second Disintegration Level (Nanofibrillar Cellulose)

The half-fabricate is transported to the destination, location of use, where it is made to nanofibrillar cellulose, which is the end product of the process chain Nanofibrillar cellulose (NFC) refers to a collection of isolated cellulose microfibrils or microfibril bundles derived from cellulose raw material. Nanofibrillar cellulose has typically a high aspect ratio: the length might exceed one micrometer while the number-average diameter is typically below 200 nm. The diameter of nanofibril bundles can also be larger but generally less than 5 μm. The smallest nanofibrils are similar to so called elementary fibrils, which are typically 2-12 nm in diameter. The dimensions of the fibrils or fibril bundles are dependent on raw material and disintegration method. The nanofibrillar cellulose may also contain some hemicelluloses; the amount is dependent on the plant source. Mechanical disintegration of nanofibrillar cellulose from the half fabricate is carried out with suitable equipment such as a refiner, grinder, homogenizer, colloider, friction grinder, ultrasound sonicator, fluidizer such as microfluidizer, macrofluidizer or fluidizer-type homogenizer. The disintegration method is to some extent dependent on the modification method of the fibrous raw material and conversion degree of the cellulose.

Because the fibers of the fibrous raw material are already disintegrated to the first disintegration level in the half-fabricate, due to the disintegration treatment at the manufacturing location, an equipment of smaller capacity can be used at the location of use, compared with the case where the nanofibrillar cellulose were to be prepared all the way from the cellulose pulp or pretreated cellulose pulp. The energy demand of the disintegration (expressable as kWh/ton or corresponding variables) is also smaller. On the other hand, the half-fabricate can be brought to high dry matter content with good capacity of the equipment, and the raising the dry matter content in between does not affect negatively the manufacturing process to final NFC.

At the location of use, the half-fabricate is diluted to suitable concentration, which is dependent on the disintegration method. The starting concentration of the half-fabricate in most cases is between 1-5%. The NFC issues form the disintegration at approximately the same concentration as the half-fabricate is fed to the disintegration. Thus, at the site of use, prior to the disintegration, the half-fabricate is diluted to the same concentration as is desired for the NFC of the end application. However, it is possible that the concentration of NFC obtained from the disintegration is adjusted for the end use. It is for example possible that the half-fabricate is disintegrated at higher consistency than the final use concentration of the NFC, and the NFC obtained from the disintegration is diluted to the final use concentration.

The disintegration to the NFC is performed at a pH of 5-10, preferably 7-9. If the half-fabricate supplied to the location of use is in acid form, the pH is raised to the above ranges prior to the disintegration.

The nanofibrillar cellulose can also be characterized through some rheological values. NFC forms a viscous gel, "hydrogel" when dispersed in water already at relatively low concentrations (1-2 wt-%). A characteristic feature of the NFC is its shear thinning behavior in aqueous dispersion, which is seen as a decrease in viscosity with increasing shear rate. Further, a "threshold" shear stress must be exceeded before the material starts to flow readily. This critical shear stress is often called the yield stress. The viscosity of the NFC can be best characterized by zero-shear viscosity, which corresponds to the "plateau" of constant viscosity at small shearing stresses approaching zero.

Figure 7:
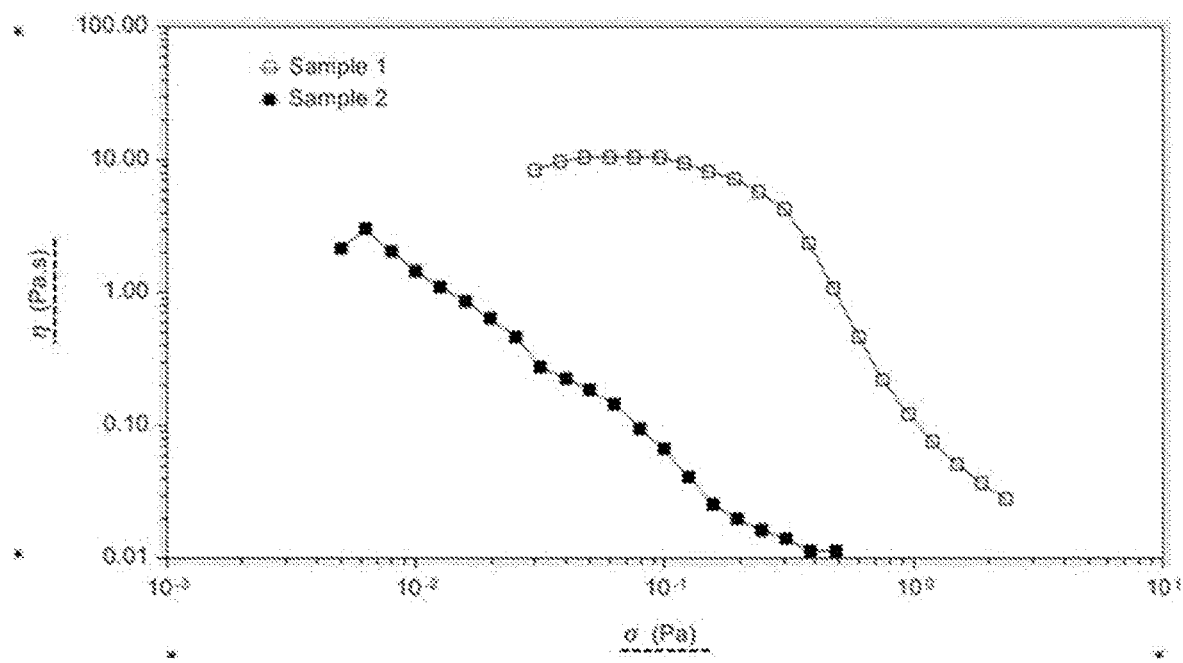

The half-fabricate has a considerably lower Brookfield viscosity (10 rpm), measured at a concentration of 0.8% in aqueous medium, than the NFC. On the other hand, as shown by FIG. 7, the half-fabricate may already show yield stress and zero-shear viscosity. In rheometry curves of FIG. 7 made with a stress controlled rotational rheometer at a sample concentration of 0.5% (aqueous medium), the sample of oxidized cellulose pulp with carboxylate content of 0.81 mmol/g passed two times through the disperser-type device at 2.7% consistency is represented by white squares (Sample 1) and the sample of the same pulp with only one pass is represented by black squares (Sample 2). While sample 2 only shows evenly decreasing viscosity values with increasing stress values, Sample 1 produces already a rheometric curve that has a shape typical of NFC gels, with the "plateau" before a steep drop in the curve as the stress increases, but the zero shear viscosity is considerably lower as with the final NFC.

It is understood that the half-fabricate can be made in several grades so that the user in the location of use can order a suitable grade which depends on the desired end properties of the NFC and the available disintegrating equipment. The Brookfield viscosity is one variable which can be used for characterizing the half-fabricate. The Brookfield viscosity (measured at 0.8% consistency and 10 rpm) of the various grades is in the range of 200-10000 mPa·s. Subranges for different grades can be 200-2000, 1000-4000, 2000-7000 or 4000-10000 mPa·s. Two or more grades having different Brookfield viscosities can be within the same subrange or in at least two different subranges.

The zero-shear viscosity of the final NFC measured with a stress controlled rotational rheometer at a concentration of 0.5% (aqueous medium) can vary within wide boundaries, depending on the modification method and conversion degree, and it is typically between 1000 and 100000 Pa·s, preferably 5000 and 50000 Pa·s. The yield stress of the NFC determined by the same method is between 1 and 50 Pa, preferably in the range of 3-15 Pa. The user can set the process variables according to the desired properties of the nanofibrillar cellulose and the grade of the half-fabricate supplied when using the equipment in preparing the end product.

Furthermore, the aim is to obtain nanofibrillar cellulose whose turbidity is typically lower than 80 NTU, advantageously from 10 to 60 NTU, at a consistency of 0.1 wt % (aqueous medium), measured by nephelometry.

The location of use where the NFC is made from the half-fabricate can be a paper mill, and the NFC made can be processed further depending on the end use at the paper mill, by dilution, concentration, or making the NFC from the half-fabricate in a concentration ready for use. The NFC can be used for wet end addition to the furnish for making paper or the NFC can be added to paper coating composition. Other locations where the NFC is made from the half-fabricate can be construction companies, composite material manufacturers, pharmaceutical companies, cosmetics manufacturers, food companies, oil companies, or coating material manufacturers. The locations are not limited to the listed locations, but the half-fabricate can be dispatched anywhere where there is need to use nanofibrillar cellulose.

The location of use, where the NFC is made from the half-fabricate, can already have the necessary equipment, if NFC concentrate is redispersed there because the treatment may partly also involve refibrillation or even additional fibrillation of the NFC. The same equipment as is used for redispersing the NFC concentrate an thus be used, depending on the type of equipment. As an alternative to using the existing equipment, the location of use can purchase or hire the equipment from the supplier of the half-fabricate when it starts to manufacture the NFC from the half-fabricate. The equipment purchased or hired can be the disintegrating device itself, but it can also comprise instrumentation for the control of the disintegrating process. The instrumentation comprises preferably a temperature sensor to be placed before the disintegrating device and a temperature sensor to be placed after the disintegrating device DIS for measuring the temperature difference, which equals the temperature rise during the disintegration and is a measure of the efficiency of the process. To measure the properties of the nanofibrillar cellulose itself, the instrumentation may also comprise an on-line turbidometer which can be calibrated to the half-fabricate grade supplied and consequently to the nanofibrillar cellulose grade that is produced. The instrumentation can also comprise an on-line viscometer based on pressure difference.

In FIG. 1, the arrow "TRANS" illustrates the transport of the disintegration equipment (EQUIPMENT) to the location of use for performing the disintergration (DIS2) to nanofibrillar cellulose. The equipment is especially the above-mentioned disperser-type device (described with reference to FIGS. 2 and 3), where the half-fabricate flows through several concentric counter-rotating rotors in such a way that the material is repeatedly subjected to shear and impact forces by the effect of the different counter-rotating rotors, or a homogenizer, where the modified cellulose pulp is subjected to homogenization by the effect of pressure.

If the disperser-type device with several concentric counterrotating rotors is used, the number of passes through the device is two at the most, preferably one, to attain sufficient viscosity of the NFC, as expressed by Brookfield viscosity of above 15000 mPa·s (measured at 10 rpm, 0.8% NFC concentration).

Figure 5:
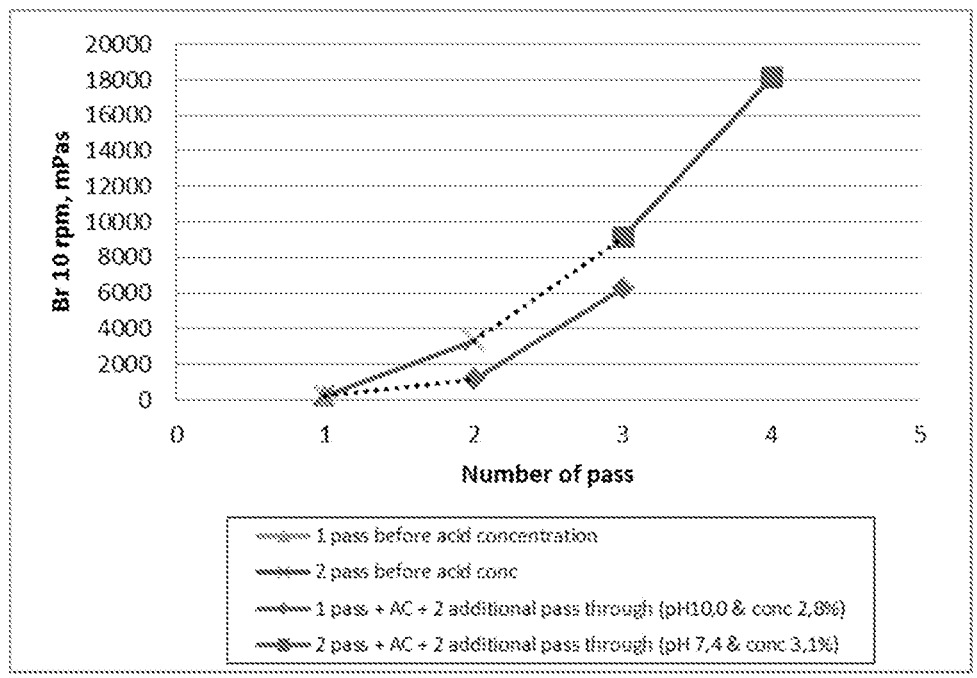
Figure 6:
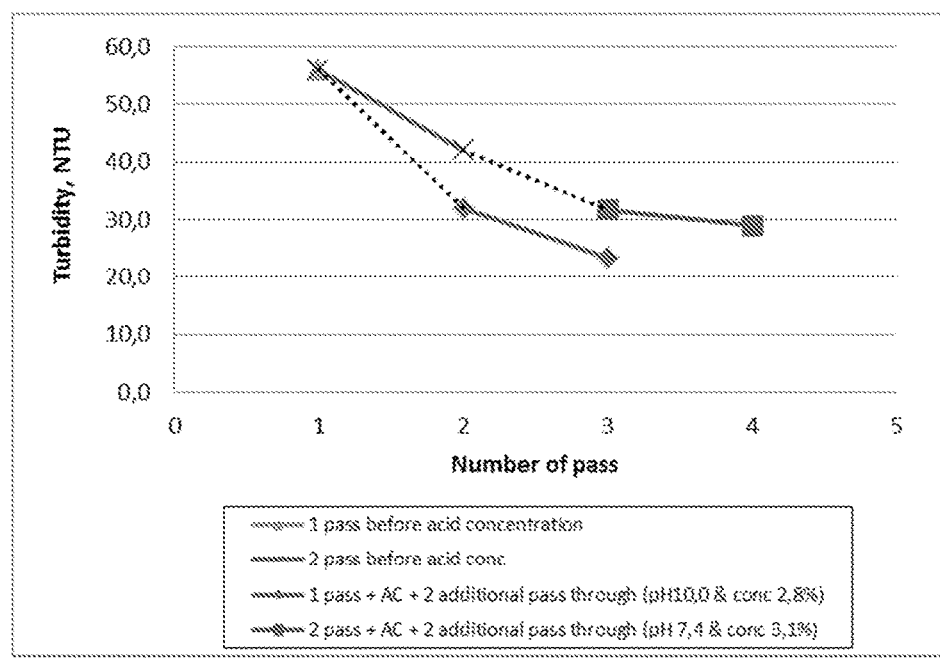

FIGS. 5 and 6 illustrate the whole course from the raw material to final NFC using the disperser-type device of FIGS. 2 and 3. FIG. 5 shows the development of Brookfield viscosity (measuring consistency 0.8 wt-%, rotation speed 10 rpm) as a function of number of passes through the device, with intervening dewatering. The initial disintegration consistency of the pulp (before the concentration step) was 2.7% at pH 7.3, and the carboxylate amount of the pulp was 0.81 mmol/g. The broken line represents the concentration step where the half-fabricate acidified and the dry matter content is raised by filtration. After the concentration step, the half-fabricate was diluted with water to disintegration consistency, its pH was raised with a base, and the disintegration to final NFC proceeded in two passes through the device. The disintegration concentration of the one-pass half-fabricate was 2.8 wt-% and the pH was 10, and the values for the two-pass half-fabricate were 3.1 wt-% and pH 7.4, respectively.

In the concentration step, the one-pass half-fabricate was concentrated to a higher dry matter content than the two-pass half-fabricate.

As can be seen, in two passes from the raw material to the half-fabricate, the Brookfield viscosity can be raised to the level between 2000 and 4000 mPa·s. Further, in two passes from the half-fabricate to the NFC, a Brookfield viscosity of the NFC that is well above 15000 mPa·s can be attained. When compared with FIG. 7, it can be seen that the half-fabricate made in two passes before the concentration already showed rheological characteristics of NFC, because it was already partly gelled and contained nanoscale fibrils. FIG. 6 illustrates the development of turbidity during the processes of FIG. 5. A low turbidity level is attainable with both procedures.

Another alternative is to perform the disintegration to the first disintegration level already at a high solids content, that is, at high consistency so that the dry matter is suitable for transport and the concentration step can be avoided. Especially anionically charged cellulose containing carboxyl groups is suitable for this procedure. disintegration can be performed to chemically modified pulp at dry matter where the pulp is after the washing (20-30 wt-%) using the disperser-type device shown in FIGS. 2 and 3 with three passes through the device. The half-fabricate issues at the high dry matter content (20-30 wt-%) and can be packed and transported as such. In the destination the half-fabricate can be disintegrated to NFC as described before, but since concentration by acidification is not used, the neutralization of the half-fabricate can be omitted.

Figure 8:
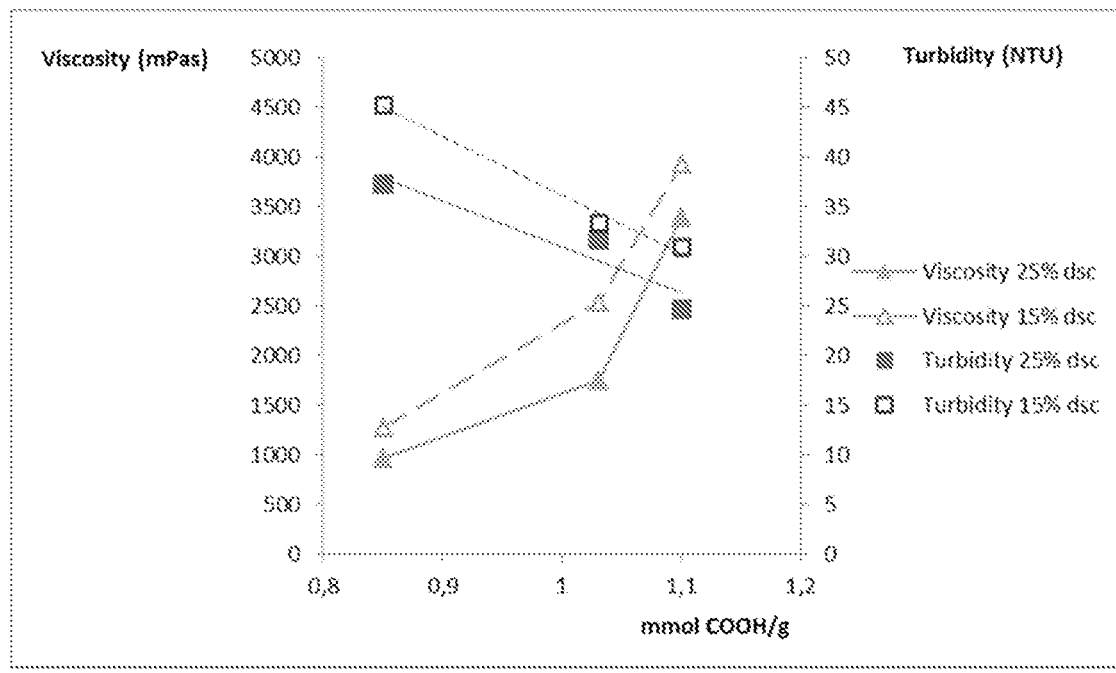

FIG. 8 shows the effect of oxidation level of the pulp (carboxylate amount) on the attained Brookfield viscosity and turbidity when the half-fabricate is made initially at high consistency. These values are measured as before. The dry matter contents (dsc) in the disintegration are 15% and 25%. As can be seen, the disintegration can be well performed at higher consistency of 25% with good viscosity results, but it is preferable that carboxylate content is high enough. As can be seen, the viscosity rises clearly when the carboxylate content is at least 1.05 mmol/g pulp, and best results are attained, when the carboxylate content is 1.1 mmol/g or higher.

Figure 9:
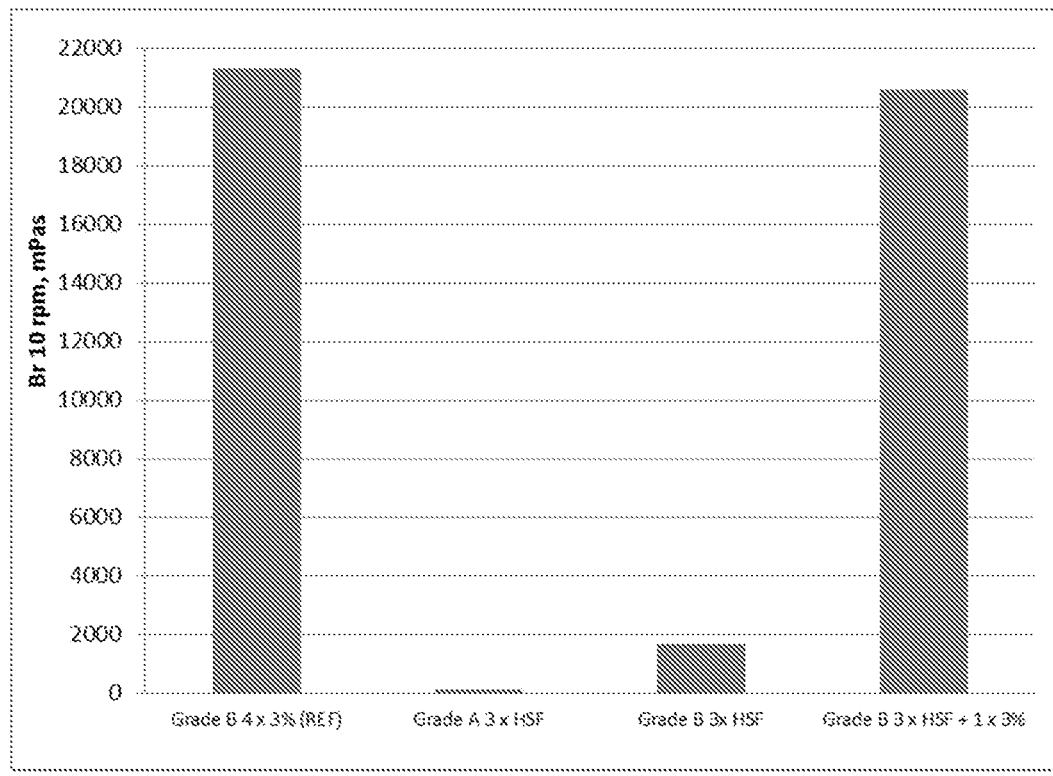
Figure 10:
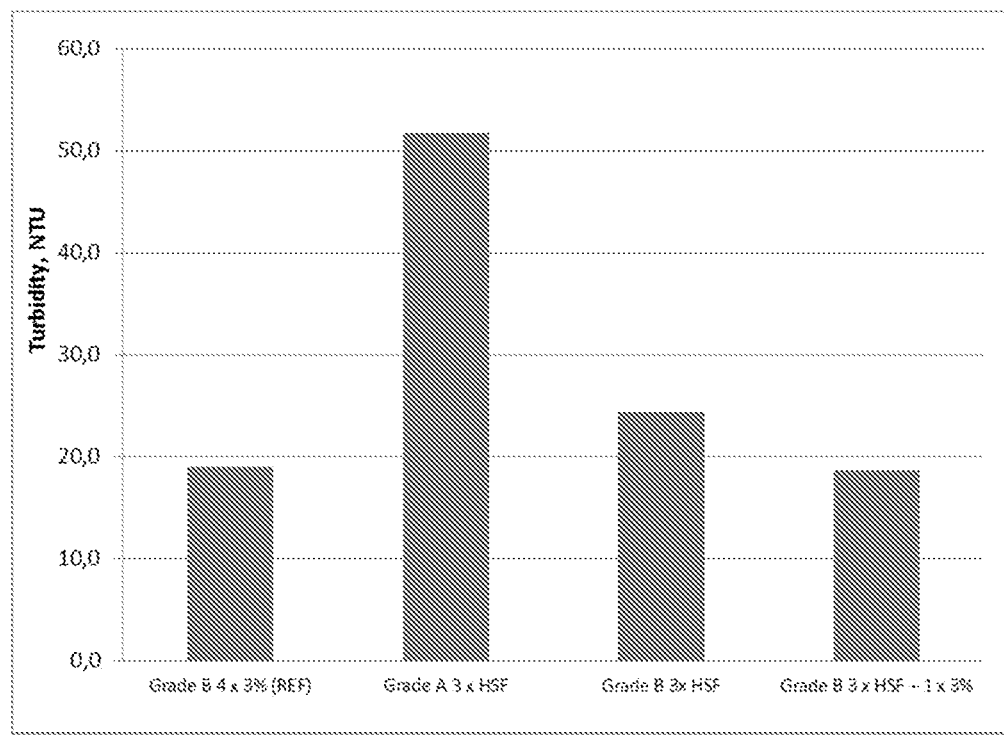

FIGS. 9 and 10 show the normal procedure of disintegrating the raw material directly to NFC (REF) at low consistency and the procedure of disintegrating the raw material first at high solids content (HSF, "high solids fibrillation") to high solids half-fabricate and in the second phase to NFC by dilution of the half-fabricate to low consistency and disintegration. Grade B has carboxylate content of 1.1 mmol/g and grade A 0.77 mmol/g. The columns show Brookfield viscosity (FIG. 9) and turbidity (FIG. 10) as indicators of the results (measuring concentrations as before). Grade B attained Brookfield viscosity between 1500 and 2000 mPa·s, whereas with Grade A having oxidation level below 1 mmol/g the viscosity remained very low and far from values suitable for the half-fabricate. Only one pass of the half-fabricate in the disperser-type device at 3% consistency was enough to raise the Brookfield viscosity above 20000 mPa·s (rightmost column), to the same level with the reference obtained with the same grade B in the same total number of passes (4) through the device but at 3% consistency. The turbidity shows similar trends, the value below 20 NTU being attainable both through high solids content disintegration and with the reference.

The fibrous raw material having sufficient oxidation level of the cellulose can thus be made to half-fabricate at high solids content by disintegrating the pulp at high consistency, preferably 15-30 wt-%, and the half-fabricate can be made to NFC having high Brookfield viscosity by one pass.

Figure 11:
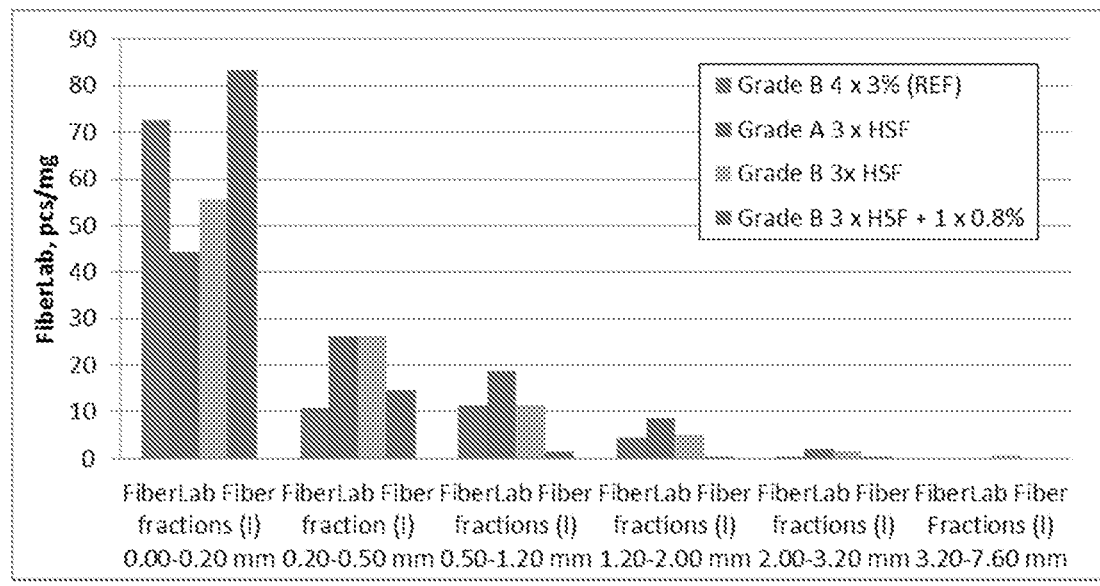

FIG. 11 shows the FiberLab analysis results of the same materials as in FIGS. 9 and 10, with the columns in the same order in each fraction. The amounts of the detectable fibers in each length fraction is indicated as numbers (pieces/mg). The NFC made from grade B through the high-solids half fabricate shows approximately the same number-based fiber length distribution as the reference (rightmost column and leftmost column). In the half-fabricate (grade B), the numerically largest length fraction is 0.00-0.20 mm.

The invention claimed is:

1. A method for preparing nanofibrillar cellulose, comprising
    disintegrating a fibrous cellulosic raw material to a first disintegration level to a half-fabricate, wherein the disintegration level corresponds to a degree of fibrillation of the disintegrated fibrous cellulosic raw material,
    transporting the half-fabricate in the first disintegration level in concentrated form, where the dry matter of the half-fabricate is in the range of 20-60 wt. %, to a destination, and
    at the destination, disintegrating the half-fabricate from the first disintegration level to a second disintegration level to nanofibrillar cellulose;
    wherein the half-fabricate has Brookfield viscosity measured at 0.8 wt. % and 10 rpm between 1,000 and 10,000 mPa·s.

2. The method according to claim 1, wherein the method further comprises
    after disintegrating the fibrous cellulosic raw material to the half-fabricate, raising the concentration of the half fabricate to obtain the half-fabricate in concentrated form.

3. The method according to claim 2, wherein the concentration of the half-fabricate is raised by dewatering by filtration.

4. The method according to claim 2, wherein the concentration is raised by dewatering at least partly by pressure.

5. The method according to claim 2, wherein raising the concentration comprises lowering the pH of a suspension of the half fabricate.

6. The method according to claim 2, wherein the fibrous cellulosic raw material is disintegrated to the first disintegration level at a consistency of 1-5%.

7. The method according to claim 5, wherein the cellulose in the half fabricate contains dissociable acid moieties comprising carboxyl groups.

8. The method according to claim 1, wherein the fibrous cellulosic raw material is disintegrated to the first disintegration level to the half-fabricate at a consistency of 15 to 30 weight percent such that the half fabricate issues in the concentrated form, where it is transported.

9. The method according to claim 1, wherein the fibrous cellulosic raw material is disintegrated to the first disintegration level to partly fibrillated half-fabricate.

10. The method according to claim 1, wherein the fibrous cellulosic raw material is enzymatically or chemically modified cellulose.

11. The method according to claim 10, wherein the half-fabricate is disintegrated to the second disintegration level to nanofibrillar cellulose
    in a homogenizer,
    in a fluidizer, or
    in a disperser-type device, where the half-fabricate flows through several counter-rotating rotors in such a way that the half-fabricate is repeatedly subjected to shear and impact forces by the effect of the different counter-rotating rotors, by passing the half-fabricate one or more times through the disperser-type device.

12. The method according to claim 1, wherein the fibrous cellulosic raw material is disintegrated to the first disintegration level to the half-fabricate in a disperser-type device, where the fibrous cellulosic raw material flows through several counter-rotating rotors in such a way that the material is repeatedly subjected to shear and impact forces by the effect of the different counter-rotating rotors, by passing the fibrous cellulosic raw material one or more times through the disperser-type device.

13. The method according to claim 12, wherein the half-fabricate is disintegrated to the second disintegration level to nanofibrillar cellulose
    in a homogenizer,
    in a fluidizer, or
    in a disperser-type device, where the half-fabricate flows through several counter-rotating rotors in such a way that the half-fabricate is repeatedly subjected to shear and impact forces by the effect of the different counter-rotating rotors, by passing the half-fabricate one or more times through the disperser-type device.

14. The method according to claim 1, wherein it comprises:
    diluting the half-fabricate at the destination from the concentrated form to a disintegrating concentration, and
    disintegrating the half-fabricate in the disintegrating concentration from the first disintegration level to the second disintegration level to nanofibrillar cellulose.

15. The method according to claim 14, wherein the half-fabricate is disintegrated to the second disintegration level to nanofibrillar cellulose
    in a homogenizer,
    in a fluidizer, or
    in a disperser-type device, where the half-fabricate flows through several counter-rotating rotors in such a way that the material is repeatedly subjected to shear and impact forces by the effect of the different counter-rotating rotors, by passing the half-fabricate one or more times through the disperser-type device.

16. The method according to claim 1, wherein the fibrous cellulosic raw material is ionically charged cellulose.

17. The method according to claim 16, wherein the ionically charged cellulose is anionically charged cellulose containing carboxyl groups.

* * * * *